A. HEARTSILL.
Shovel-Plow and Harrow Attachment.
No. 209,043. Patented Oct. 15, 1878.
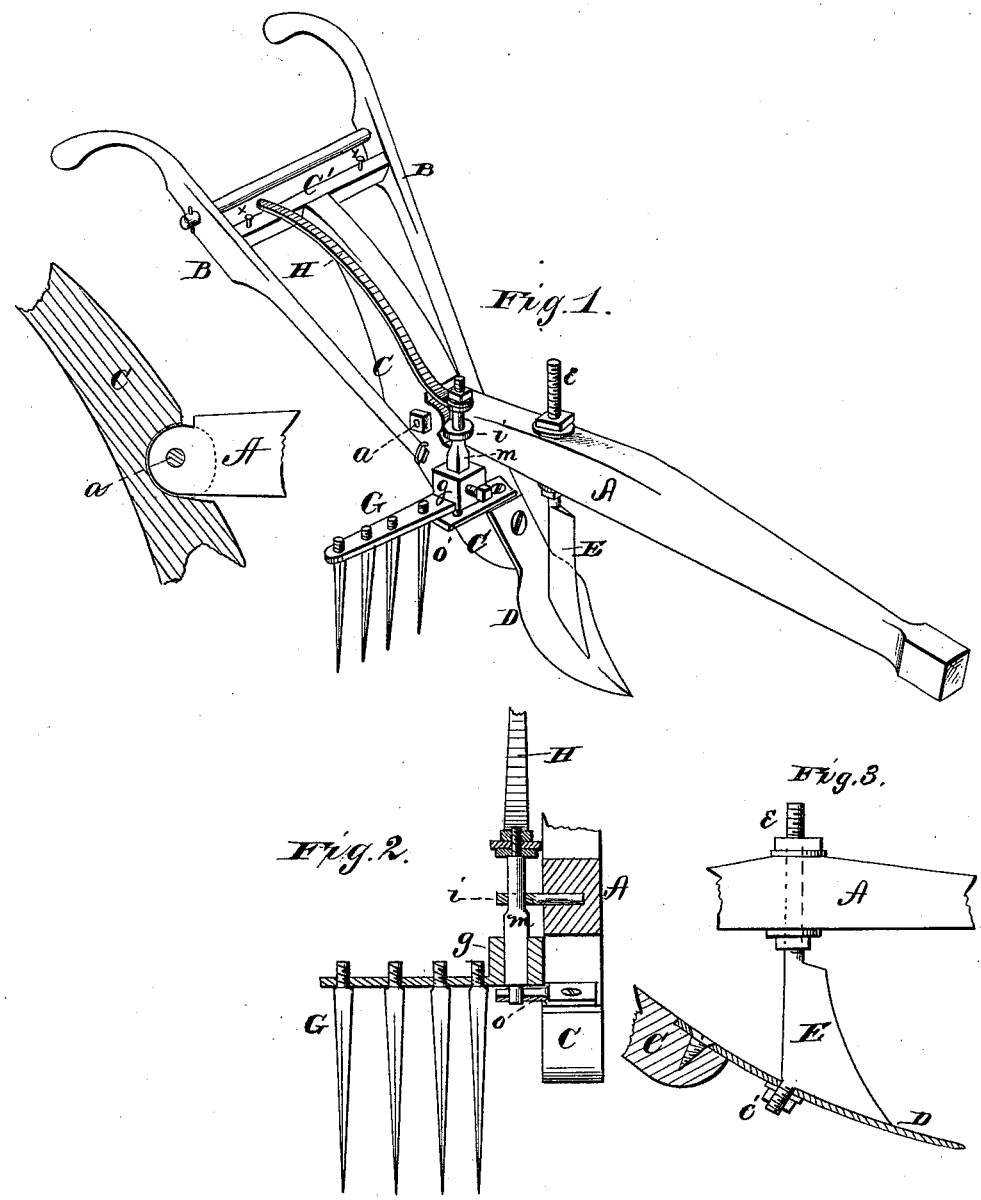

UNITED STATES PATENT OFFICE.

ABRAM HEARTSILL, OF LOUISVILLE, TENNESSEE.

IMPROVEMENT IN SHOVEL-PLOW AND HARROW ATTACHMENTS.

Specification forming part of Letters Patent No. 209,043, dated October 15, 1878; application filed July 10, 1878.

*To all whom it may concern:*

Be it known that I, ABRAM HEARTSILL, of Louisville, in the county of Blount, and in the State of Tennessee, have invented certain new and useful Improvements in Shovel-Plow with Harrow Attachments; and do hereby declare that the following is a full, clear, and exact description thereof, reference being had to the accompanying drawings, and to the letters of reference marked thereon, making a part of this specification.

The nature of my invention consists of a shovel-plow or cultivator having a harrow attachment, as hereinafter more fully set forth.

In the accompanying drawings, which form a part of this specification, Figure 1 represents a perspective view; Fig. 2, a cross-section taken through the plow-beam in front of the harrow attachment; and Fig. 3, a broken view of the beam, showing the mode of attaching the colter to the shovel and beam.

In order to enable others skilled in the art to construct and use my invention, I will proceed to more particularly describe the same.

A represents the plow-beam, which is hinged at its rear end to the extended plow-foot C, as seen at $a$, by means of a bolt and nut or other suitable device. In the present instance the extended foot C has a groove, and the rear of the beam has a tenon, which is inserted in the groove, and the two are held together by the bolt and nut, so that the beam can freely move up and down, as desired; but I do not wish to confine myself to any particular manner of hinging the beam to the foot.

B B are the usual handles, which are secured to the foot at their lower ends, while their upper ends are connected by a round. A cross-bar, C', below the round and connected to the handles, rigidly secures the top of the plow-foot C. D represents a shovel-plow, of any suitable form, which is secured to the lower extremity of the foot C.

E is a colter, which is provided at its top with an elongated screw-tenon, $e$, which passes through the beam, and is also provided with a screw-tenon, $e'$, at the bottom, which passes through the shovel D. Both tenons are connected by washers and nuts, so that a rigid connection is made between the plow-beam and the shovel on the foot. The beam can be raised or lowered to suit by adjusting the screws on the upper tenon.

G represents the harrow attachment, which is capable of a vertical adjustment as well as a rotary movement. It is composed of a horizontal bar, to which harrow-teeth are attached, and is provided with a hollow box, $g$, at its end nearest the beam.

$o$ is an outwardly-extended plate connected to the lower portion of the plow-foot. $m$ is a vertical shaft, the lower portion of which is square and the upper portion of which is round. The upper portion of this shaft passes through an eyebolt, $i$, connected to the beam, and the square portion passes through the box $g$ of the harrow-head. The extreme lower end has a round tenon, and passes through an opening in the plate $o$. A set-screw holds the box and shaft together, as seen, so that by loosening this screw the harrow can be raised or lowered on the shaft and held at the desired position.

H represents a lever, which is connected to the top of the shaft $m$ and extends to the cross-bar C', so as to be within easy reach of the operator. By moving this lever to the right or left the angle of the harrow is changed with respect to the beam, or the harrow can be brought on a line with the beam, so as to be inoperative. Studs $x$ $x$ on the cross-bar C' hold the lever in place.

By this construction of implement the ground can be cultivated and harrowed at one and the same time.

Having thus fully described my invention, what I claim as new, and desire to secure by Letters Patent, is—

1. The colter E, provided with the top and bottom screw-rods, $e$ $e'$, in combination with the shovel D, beam A, and standard C, the rear end of the beam being hinged to the standard, and adjusted by nuts on the upper screw-rod, $e$, substantially as and for the purposes herein set forth.

2. The vertically-adjustable harrow attachment G, connected to the side of the plow-beam, and operated by the lever H to a suitable angle with respect to the beam, as set forth.

In testimony that I claim the foregoing I have hereunto set my hand this 4th day of June, 1878.

ABRAM HEARTSILL.

Witnesses:
J. M. JOHNSTON,
A. H. LOVE.